United States Patent
Hirano et al.

(10) Patent No.: US 11,753,523 B2
(45) Date of Patent: Sep. 12, 2023

(54) CROSSLINKABLE ELASTOMER COMPOSITION AND FLUORORUBBER MOLDED ARTICLE

(71) Applicant: DAIKIN INDUSTRIES, LTD., Osaka (JP)

(72) Inventors: Seiichi Hirano, Osaka (JP); Tsuyoshi Noguchi, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 458 days.

(21) Appl. No.: 16/755,632

(22) PCT Filed: Oct. 17, 2018

(86) PCT No.: PCT/JP2018/038627
§ 371 (c)(1),
(2) Date: Apr. 13, 2020

(87) PCT Pub. No.: WO2019/078238
PCT Pub. Date: Apr. 25, 2019

(65) Prior Publication Data
US 2020/0332081 A1 Oct. 22, 2020

(30) Foreign Application Priority Data
Oct. 18, 2017 (JP) ................. 2017-201923

(51) Int. Cl.
C08K 3/34 (2006.01)
C08K 3/14 (2006.01)
C08L 27/18 (2006.01)
C08K 3/10 (2018.01)

(52) U.S. Cl.
CPC ............... *C08K 3/34* (2013.01); *C08K 3/10* (2013.01); *C08K 3/14* (2013.01); *C08L 27/18* (2013.01); *C08K 2201/005* (2013.01)

(58) Field of Classification Search
None
See application file for complete search history.

(56) References Cited

U.S. PATENT DOCUMENTS

| | | | | |
|---|---|---|---|---|
| 3,549,342 | A * | 12/1970 | Hayek | C09K 3/1409 |
| | | | | 51/298 |
| 5,912,216 | A * | 6/1999 | Thimmappaiah | B24D 3/344 |
| | | | | 51/306 |
| 8,173,727 | B2 † | 5/2012 | Nishibayashi | |
| 2003/0045623 | A1 | 3/2003 | Higashino et al. | |
| 2005/0070637 | A1 | 3/2005 | Nishibayashi et al. | |
| 2006/0058448 | A1 | 3/2006 | Higashino et al. | |
| 2009/0023852 | A1 | 1/2009 | Tanaka et al. | |
| 2012/0289641 | A1 | 11/2012 | Hirano et al. | |
| 2017/0283585 | A1 | 10/2017 | Sumino et al. | |

FOREIGN PATENT DOCUMENTS

| | | | |
|---|---|---|---|
| CN | 106084297 A | 11/2016 | |
| DE | 4113853 A1 * | 10/1992 | |
| EP | 0251322 A2 * | 7/1988 | |
| JP | 2005225947 A * | 8/2005 | |
| JP | 2009-30064 A | 2/2009 | |
| JP | 2011-213540 A | 10/2011 | |
| JP | 2012-509975 A | 4/2012 | |
| JP | 2012-106888 A | 6/2012 | |
| JP | 2013-529710 A | 7/2013 | |
| KR | 20110087290 A * | 8/2011 | |
| KR | 10-2017-0049561 A | 5/2017 | |
| TW | 200304469 A | 10/2003 | |
| WO | 01/32782 A1 | 5/2001 | |
| WO | 2004/063281 A1 | 7/2004 | |
| WO | 2005/017017 A1 | 2/2005 | |
| WO | WO-2005040783 A1 * | 5/2005 | ......... G01N 33/5436 |
| WO | 2005/082998 A1 | 9/2005 | |
| WO | 2011/163575 A2 | 12/2011 | |
| WO | 2016/043100 A1 | 3/2016 | |

OTHER PUBLICATIONS

Machine translation of JP 200522547 A, retrieved Dec. 2022 (Year: 2022).*
International Preliminary Report on Patentability with translation of Written Opinion dated Apr. 21, 2020, in Application No. PCT/JP2018/038627.
International Search Report for PCT/JP2018/038627 dated Dec. 25, 2018 (PCT/ISA/210).
Extended European Search Report dated Apr. 28, 2021, issued by the European Patent Office in application No. 18867356.0.
"NMSiC99 @ 35 nm", Nanomakers SA, Mar. 1, 2022, XP093005214, Retrieved from the Internet on Dec. 6, 2022: https://nanomakers.fr/wp-content/uploads/2022/07/PDS_NMSIC99@35_Rev0322.pdf, 1 page.
"Analysis and Test Report", Tosoh Analysis and Research Center Co., Ltd., 2022, (18 total pages).
"Statement of Delivery of Sample used in Certificate of Experimental Results", Tosoh Analysis and Research Center Co., Ltd., 2017, (2 total pages).
Opinion dated Aug. 25, 2022 in response to a Notice of reasons for revocation of a patent for counterpart JP patent No. 6927319 dated Jun. 27, 2022.

(Continued)

*Primary Examiner* — Nicole M. Buie-Hatcher
(74) *Attorney, Agent, or Firm* — Sughrue Mion, PLLC

(57) ABSTRACT

A crosslinkable elastomer composition including a crosslinkable elastomer and a surface-oxidized non-oxide ceramic. Also disclosed is a fluoroelastomer molded article having a weight reduction percentage of 2.5% by mass or less and an amount of particles generated of 0.05% by mass or less after $O_2$ plasma irradiation, a weight reduction percentage of 1.8% by mass or less, an amount of particles generated of 0.05% by mass or less after $NF_3$ plasma irradiation, and a compression set of 50% or less after aging at 300° C. for 70 hours.

4 Claims, No Drawings

(56) References Cited

OTHER PUBLICATIONS

"Nano Carbure de Silicium—Nanomakers", Nanomakers, Retrieved from the Internet on Feb. 10, 2023: <https://nanomakers.fr/en/produits/nano-carbure-de-silicium/>, pp. 1-9 (9 total pages).
Kazuya Shimoda et al Surface properties and dispersion behaviors of SiC nanopowders Colloids and Surfaces A Physicochem Eng Aspects 463 2014 pp. 93 100.†
Young Wook Kim et al Sinterability of Nano-Sized Silicon Carbide Powders Journal of the Ceramic Society of Japan 114 8 2006 pp. 681 685.†

\* cited by examiner
† cited by third party

CROSSLINKABLE ELASTOMER COMPOSITION AND FLUORORUBBER MOLDED ARTICLE

CROSS REFERENCE TO RELATED APPLICATIONS

This application is a National Stage of International Application No. PCT/JP2018/038627 filed Oct. 17, 2018, claiming priority based on Japanese Patent Application No. 2017-201923 filed Oct. 18, 2017.

TECHNICAL FIELD

The invention relates to crosslinkable elastomer compositions and fluoroelastomer molded articles.

BACKGROUND ART

Members used in semiconductor manufacturing devices, such as CVD apparatuses and erchers, are required to have resistance to $NF_3$ plasma treatment and $O_2$ treatment that are performed in the production process. An example of known compositions constituting such a member is a composition containing a crosslinkable fluorine-containing elastomer and $SiO_2$ as disclosed in Patent Literature 1. Another example thereof is a composition containing a crosslinkable fluorine-containing elastomer and silicon carbide particles having a bulk density of 0.15 g/cm$^3$ or less as disclosed in Patent Literature 2.

CITATION LIST

Patent Literature

Patent Literature 1: WO 2005/17017
Patent Literature 2: JP 2012-509975 T

SUMMARY OF INVENTION

Technical Problem

The invention aims to provide a crosslinkable elastomer composition having a small weight reduction percentage and amount of particles generated after plasma irradiation under specific conditions and a small compression set at high temperature.

Solution to Problem

The inventors found through various studies that use of a surface-oxidized non-oxide ceramic filler can improve the weight reduction percentage and amount of particles generated after plasma irradiation under specific conditions and the compression set at high temperature, completing the invention.

In other words, the invention relates to a crosslinkable elastomer composition including a crosslinkable elastomer and a surface-oxidized non-oxide ceramic filler.

The non-oxide ceramic filler is preferably silicon carbide.
The non-oxide ceramic filler preferably has an average particle size of 0.1 µm or smaller.
The crosslinkable elastomer is preferably a copolymer of tetrafluoroethylene and perfluoro(alkyl vinyl ether).

The invention also relates to a fluoroelastomer molded article having a weight reduction percentage of 2.5% by mass or less and an amount of particles generated of 0.05% by mass or less after $O_2$ plasma irradiation under the following conditions, a weight reduction percentage of 1.8% by mass or less and an amount of particles generated of 0.05% by mass or less after $NF_3$ plasma irradiation under the following conditions, and a compression set of 50% or less after aging at 300° C. for 70 hours, the conditions being:
Sample: O-ring (AS-568A-214)
Measurement Details:
(1) $O_2$ Plasma
Plasma irradiation device: ICP high-density plasma device (MODEL RIE-101iPH available from Samco Inc.)
Irradiation conditions
Gas flow rate: 16 SCCM
RF output: 400 Wh
Pressure: 2.66 Pa
Etching time: 30 minutes
Temperature: 100° C.
These conditions allowing a perfluoroelastomer (non-filler) to be etched at a rate of 12000 Å/min
(2) $NF_3$ Plasma
Plasma irradiation device: ICP high-density plasma device (MODEL RIE-101iPH available from Samco Inc.)
Irradiation Conditions
Gas flow rate: 16 SCCM
RF output: 400 Wh
Pressure: 10 Pa
Etching time: 4 hours
Temperature: 200° C.
These conditions allowing a thermally oxidized silicon ($SiO_2$) wafer film to be etched at a rate of 90 Å/min.

Advantageous Effects of Invention

The crosslinkable elastomer composition of the invention, containing a surface-oxidized non-oxide ceramic filler, can simultaneously achieve a small weight reduction percentage and amount of particles generated after plasma irradiation (plasma resistance) and a small compression set at high temperature (heat resistance).

DESCRIPTION OF EMBODIMENTS

The crosslinkable elastomer composition of the invention contains a crosslinkable elastomer and a surface-oxidized non-oxide ceramic filler. The filler may not be completely surface-oxidized and may be partially surface-oxidized. The surface-oxidation state can be determined by electron spectroscopy for chemical analysis (ESCA). ESCA enables elemental analysis of a site about 3 to 5 nm deep from the surface of a particle, and thus can determine whether the surface of the filler is oxidized or not.

Examples of the non-oxide ceramic filler include, but are not limited to, a carbide, a silicide, a sulfide, and a fluoride. Examples of the carbide include titanium carbide, boron carbide, zirconium carbide, hafnium carbide, tantalum carbide, tungsten carbide, niobium carbide, and silicon carbide. Examples of the silicide include titanium silicide, molybdenum silicide, and zirconium silicide. Examples of the sulfide include tungsten sulfide and molybdenum disulfide. Examples of the fluoride include aluminum fluoride, yttrium fluoride, and barium fluoride. In order to simultaneously achieve a small weight reduction percentage and amount of particles generated after plasma irradiation (plasma resistance) and a small compression set at high temperature (heat resistance), preferred among these is silicon carbide.

Hydrophobic silica, for example, can reduce the compression set but unfortunately increases the weight reduction percentage after NF$_3$ plasma irradiation, i.e., has insufficient plasma resistance. In contrast, silicon carbide without surface oxidation can reduce the weight reduction percentage and amount of particles generated after plasma irradiation but unfortunately increases the compression set at high temperature, i.e., has insufficient heat resistance.

In the case of silicon carbide, for example, the surfaces thereof are oxidized into SiO$_2$. In ESCA measurement, a peak assigned to SiO$_2$ and a peak assigned to SiC are observed. The peak assigned to SiO$_2$ and the peak assigned to SiC preferably give a ratio (SiO$_2$:SiC) of 1:9 to 9:1, more preferably 3:7 to 6:4. A peak ratio of less than 1:9 tends to cause insufficient surface oxidation and fails to achieve a sufficient effect of improvement. A peak ratio of more than 9:1 tends to cause excessive surface oxidation and fail to achieve a sufficient effect of improvement.

The non-oxide ceramic is preferably powdered by a pulverization using a pulverizer such as a jet mill or by powder formation in which a nuclear is generated and grown from an atom or a molecule. In the latter case, methods are sorted into a gas phase method, a liquid phase method, and a solid phase method, according to the state of the starting material. Any method may be employed as long as the resulting powder of the non-oxide ceramic has a sufficient purity. Among various non-oxide ceramics, silicon carbide preferably has a purity of 95% or higher in order to achieve excellent plasma resistance.

The non-oxide ceramic filler may be in any form, such as powder, particles, fibers, and whiskers. The non-oxide ceramic filler is preferably in the form of particles in terms of processability and preferably has an average particle size of 10 μm or smaller, more preferably 0.1 μm or smaller. The non-oxide ceramic filler having an average particle size of greater than 10 μm may cause poor reinforcement and thus a greater amount of the non-oxide ceramic filler may need to be added to a compound, impairing the characteristics of a resulting molded article as a seal material. In the case of using the resulting molded article as a seal material of a semiconductor device, the non-oxide ceramic filler has an average particle size of 0.1 μm or smaller, preferably 0.01 to 0.1 μm, in order to reduce generation of particles. The lower limit of the average particle size is not limited.

The percentage of the non-oxide ceramic filler whose surfaces are oxidized to a depth of 2 nm or more is preferably, but not limited to, 10 to 100% by mass, more preferably 30 to 100% by mass, in 100% by mass of the non-oxide ceramic filler.

The non-oxide ceramic filler is present at any amount, preferably 1 to 40 parts by mass, more preferably 5 to 25 parts by mass, relative to 100 parts by mass of the crosslinkable elastomer.

A preferred amount of the non-oxide ceramic filler depends on the average particle size of the non-oxide ceramic filler. The amount of the non-oxide ceramic filler having an average particle size of 0.01 to 0.1 μm is more preferably 1 to 40 parts by mass, still more preferably 5 to 25 parts by mass, relative to 100 parts by mass of the crosslinkable elastomer. The amount of the non-oxide ceramic filler having an average particle size of 0.1 to 10 μm is more preferably 5 to 50 parts by mass, still more preferably 10 to 30 parts by mass.

The non-oxide ceramic filler may be surface-oxidized by any method, such as heat treatment in the air, acid treatment, ozone treatment, or oxygen plasma treatment.

The heat treatment may be performed under any conditions. The temperature for the heat treatment is preferably 500° C. to 1000° C., more preferably 700° C. to 900° C. A temperature lower than 500° C. tends to cause less surface oxidation. A temperature higher than 1000° C. excessively tends to increase the surface oxidation rate to cause difficulty in controlling the thickness of the oxidized layer, resulting in excessive oxidation even inside the particles. The duration of the heat treatment is preferably 0.1 to 24 hours, more preferably 0.2 to 4 hours.

Any acid may be used for the acid treatment, and examples thereof include sulfuric acid aqueous solution, hydrogen peroxide solution, nitric acid, a mixed acid of these. The acid treatment may be performed under any conditions. The temperature for the treatment is preferably 20° C. to 100° C., and the duration of the treatment is preferably 0.1 to 24 hours, more preferably 0.2 to 4 hours.

The ozone treatment may be performed under any conditions, preferably at an ozone concentration of 100 to 300 g/N·m$^3$, a discharge amount of 40 to 80%, a cell pressure of 0.1 to 0.3 MPa, an O$_2$ flow rate of 2 to 5 L/min, a N$_2$ flow rate of 3 to 10 cc/min, and a temperature of 100° C. to 200° C.

The oxygen plasma treatment may be performed under any conditions, preferably at a power of 200 to 1000 W, an O$_2$ flow rate of 10 to 30 sccm, a pressure of 1 to 5 Pa, an irradiation temperature of 20° C. to 200° C., and an irradiation time of 0.1 to 1 hr.

The crosslinkable elastomer used may be a fluorine elastomer or a silicone elastomer. From the viewpoints of the heat resistance and the resistance to all types of plasma, a fluorine-containing elastomer is preferred.

The fluorine-containing elastomer used in the invention may be any of those conventionally used for sealing materials, particularly sealing materials for semiconductor manufacturing devices.

Examples of the fluorine-containing elastomer include a fluoroelastomer (a), a thermoplastic fluoroelastomer (b) and a rubber composition containing these fluoroelastomers.

Examples of the fluoroelastomer (a) include non-perfluoro fluoroelastomer (a-1) and perfluoro fluoroelastomer (a-2).

Examples of the thermoplastic fluoroelastomer (b) include a fluorine-containing multi-segmented polymer (b-1) containing an elastomeric fluorine-containing polymer chain segment and a non-elastomeric fluorine-containing polymer chain segment with at least 90 mol % of the structural units of both the elastomeric fluorine-containing polymer chain segment and the non-elastomeric fluorine-containing polymer chain segment being perhalo olefins; a fluorine-containing multi-segmented polymer (b-2) containing an elastomeric fluorine-containing polymer chain segment and a non-elastomeric fluorine-containing polymer chain segment with at least 90 mol % of the structural units of the elastomeric fluorine-containing polymer chain segment being perhalo olefins and with the non-elastomeric fluorine-containing polymer chain segment containing less than 90 mol % of perhalo olefins as structural units; and a fluorine-containing multi-segmented polymer (b-3) containing an elastomeric fluorine-containing polymer chain segment and a non-elastomeric fluorine-containing polymer chain segment with the elastomeric fluorine-containing polymer chain segment containing less than 90 mol % of perhalo olefins as structural units and with non-elastomeric fluorine-containing polymer chain segment containing 90 mol % or more of perhalo olefins as structural units or containing less than 90 mol % of perhalo olefins as structural units.

Examples of the non-perfluoro fluoroelastomer (a-1) include a vinylidene fluoride (VdF) fluoroelastomer, a tetrafluoroethylene (TFE)/propylene fluoroelastomer, a tetrafluoroethylene (TFE)/propylene/vinylidene fluoride (VdF) fluoroelastomer, an ethylene/hexafluoroethylene (HFP) fluoroelastomer, an ethylene/hexafluoroethylene (HFP)/vinylidene fluoride (VdF) fluoroelastomer, an ethylene/hexafluoropropylene (HFP)/tetrafluoroethylene (TFE) fluoroelastomer, a fluorosilicone fluoroelastomer, and a fluorophosphazene fluoroelastomer. These may be used alone or may be used in any combination as long as the effects of the invention are not impaired.

The vinylidene fluoride fluoroelastomer refers to a fluorine-containing elastic copolymer containing 45 to 85 mol % of vinylidene fluoride and 55 to 15 mol % of at least one different monomer copolymerizable with vinylidene fluoride, preferably a fluorine-containing elastic copolymer containing 50 to 80 mol % of vinylidene fluoride and 50 to 20 mol % of at least one different monomer copolymerizable with vinylidene fluoride.

Examples of the at least one different monomer copolymerizable with vinylidene fluoride include fluorine-containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE), and vinyl fluoride and nonfluorine-containing monomers such as ethylene, propylene, and alkyl vinyl ether. These may be used alone or may be used in any combination. Preferred among these are tetrafluoroethylene, hexafluoropropylene, and perfluoro(alkyl vinyl ether).

Specific examples of rubber include VdF-HFP rubber, VdF-HFP-TFE rubber, VdF-CTFE rubber, and VdF-CTFE-TFE rubber.

The vinylidene fluoride fluoroelastomer can be obtained by a usual method.

The tetrafluoroethylene/propylene fluoroelastomer refers to a fluorine-containing elastic copolymer containing 45 to 70 mol % of tetrafluoroethylene, 55 to 30 mol % of propylene, and 0 to 5 mol % of a monomer that gives a crosslinking site.

Examples of the monomer that gives a crosslinking site include iodine-containing monomers such as perfluoro(6,6-dihydro-6-iodo-3-oxa-1-hexene) and perfluoro(5-iodo-3-oxa-1-pentene) described in JP H05-63482 B and JP H07-316234 A, bromine-containing monomers described in JP H04-505341 A, monomers containing a nitrile group, monomers containing a carboxyl group, and monomers containing an alkoxycarbonyl group described in JP H04-505345 A and JP H05-500070 A.

The tetrafluoroethylene/propylene fluoroelastomer can also be obtained by a usual method.

These non-perfluoro fluoroelastomers (a-1) can be prepared by a usual method. Examples of commercially available products of the non-perfluoro fluoroelastomer (a-1) include DAI-EL G-800 series and DAI-EL G-900 series available from Daikin Industries, Ltd.

An example of the perfluoro fluororubber (a-2) is a copolymer containing tetrafluoroethylene and perfluoro(alkyl vinyl ether), such as a fluorine-containing elastic copolymer containing tetrafluoroethylene/perfluoro(alkyl vinyl ether)/a monomer that gives a crosslinking site. The composition thereof is preferably (45 to 90)/(10 to 50)/(0 to 5) (mol %), more preferably (45 to 80)/(20 to 50)/(0 to 5), further preferably (53 to 70)/(30 to 45)/(0 to 2). When the composition is out of this range, the properties of a rubber elastic body tend to be lost and the properties tend to become closer to those of resin.

Examples of the perfluoro(alkyl vinyl ether) in this case include perfluoro(methyl vinyl ether) and perfluoro(propyl vinyl ether). These may be used alone or may be used in any combination as long as the effects of the invention are not impaired.

An example of the monomer that gives a crosslinking site is a monomer represented by the following formula:

$$CY^1_2=CY^2R_f^2X^3$$

(wherein $Y^1$ and $Y^2$ are each H, F, or $CH_3$; $R_f^2$ is a linear or branched fluorine-containing alkylene group whose hydrogen atoms are partially or completely substituted with fluorine atoms and which optionally contains at least one oxygen atom as an ether bond and optionally contains an aromatic ring; and $X^3$ is an iodine group, a bromine group, a nitrile group, a carboxyl group, an alkoxycarbonyl group, an azide group, or an alkyne group). Specific examples thereof include an iodine-containing monomer represented by the following formula (1):

$$CX_2=CX-RfCHRI$$

(wherein X is H, F, or $CH_3$; Rf is a fluoroalkylene group, a perfluoroalkylene group, a fluoropolyoxyalkylene group, or a perfluoropolyoxyalkylene group; and R is H or $CH_3$), and a monomer represented by the following formula (2):

$$CF_2=CF(OCF_2CF(CF_3))_m-O-(CF_2)_n-X$$

(wherein m is an integer of 0 to 5; n is an integer of 1 to 3; and X is a nitrile group, a carboxyl group, an alkoxycarbonyl group, a bromine group, an azide group, or an alkyne group). These may be used alone or may be used in any combination as long as the effects of the invention are not impaired.

The iodine and nitrile groups can function as crosslinking sites.

The perfluoro fluoroelastomer (a-2) can be prepared by a usual method.

Specific examples of the perfluoro fluoroelastomer (a-2) include fluoroelastomers described in WO97/24381, JP S61-57324 B, JP H04-81608 B, and JP H05-13961 B.

The fluorine-containing multi-segmented polymer (b-1) which is the thermoplastic fluoroelastomer (b) is described below. The fluorine-containing multi-segmented polymer (b-1) contains an elastomeric fluorine-containing polymer chain segment and a non-elastomeric fluorine-containing polymer chain segment. At least 90 mol % of the structural units of both the elastomeric fluorine-containing polymer chain segment and the non-elastomeric fluorine-containing polymer chain segment are perhalo olefins.

The elastomeric fluorine-containing polymer chain segment is described. The elastomeric fluorine-containing polymer chain segment imparts flexibility to the polymer and has a glass transition temperature of at most 25° C., preferably at most 0° C. Examples of the perhalo olefins that constitute at least 90 mol % of the structural units thereof include tetrafluoroethylene, chlorotrifluoroethylene, hexafluoropropylene, and fluorovinylether represented by the following formula (3):

$$CF_2=CFO(CF_2CFYO)_p-(CF_2CF_2CF_2O)_q-Rf$$

(wherein Y is F or $CF_3$; Rf is a C1-C5 perfluoroalkyl group; p is an integer of 0 to 5; and q is an integer of 0 to 5).

Examples of the structural units other than the perhalo olefins that constitute the elastomeric fluorine-containing polymer chain segment include fluorine-containing monomers such as vinylidene fluoride, trifluoroethylene, tetrafluoroethylene, trifluoropropylene, tetrafluoropropylene, pentafluoropropylene, trifluorobutene, tetrafluoroisobutene, and vinyl fluoride and nonfluorine-containing monomers such as ethylene, propylene, and alkyl vinyl ether.

A preferred example of the elastomeric fluorine-containing polymer chain segment is an elastic polymer chain containing tetrafluoroethylene/perfluoro(alkyl vinyl ether)/a monomer that gives a crosslinking site. The composition thereof is preferably (50 to 85)/(50 to 15)/(0 to 5) (mol %).

An example of the monomer that gives a crosslinking site is a monomer represented by the following formula:

$$CY^1_2=CY^2R_f^2X^2$$

(wherein $Y^1$ and $Y^2$ are each H, F, or $CH_3$; $R_f^2$ is a linear or branched fluorine-containing alkylene group whose hydrogen atoms are partially or completely substituted with fluorine atoms and which optionally contains at least one oxygen atom as an ether bond and optionally contains an aromatic ring; and $X^3$ is an iodine group, a bromine group, a nitrile group, a carboxyl group, an alkoxycarbonyl group, an azide group, or an alkyne group). Specific examples thereof include an iodine-containing monomer represented by the following formula (4):

$$CX_2=CX-RfCHRX^1$$

(wherein X is H, F, or $CH_3$; Rf is a fluoroalkylene group, a perfluoroalkylene group, a fluoropolyoxyalkylene group, or a perfluoropolyoxyalkylene group; R is H or $CH_3$; and $X^1$ is iodine or bromine), and a monomer represented by the following formula (5):

$$CF_2=CF(OCF_2CF(CF_3))_m-O-(CF_2)_n-X$$

(wherein m is an integer of 0 to 5; n is an integer of 1 to 3; and X is a nitrile group, a carboxyl group, an alkoxycarbonyl group, a bromine group, an azide group, or an alkyne group).

The iodine, bromine, nitrile, carboxyl, and alkoxycarbonyl groups can function as crosslinking sites.

The non-elastomeric fluorine-containing polymer chain segment is described. Examples of the perhalo olefins that constitute at least 90 mol % of the structural units of the non-elastomeric fluorine-containing polymer chain segment include perhalo olefins such as tetrafluoroethylene, chlorotrifluoroethylene, perfluoro(alkyl vinyl ether), hexafluoropropylene, a compound represented by the following formula (6):

$$CF_2=CF(CF_2)_pX$$

(wherein p is an integer of 1 to 10; and X is F or Cl), and perfluoro-2-butene.

Examples of the structural units other than the perhalo olefins that constitute the non-elastomeric fluorine-containing polymer chain segment include fluorine-containing monomers such as vinylidene fluoride, trifluoroethylene, tetrafluoroethylene, trifluoropropylene, tetrafluoropropylene, pentafluoropropylene, trifluorobutene, tetrafluoroisobutene, and vinyl fluoride and nonfluorine-containing monomers such as ethylene, propylene, and alkyl vinyl ether.

A preferred example of the non-elastomeric fluorine-containing polymer chain segment is a nonelastic polymer chain containing 85 to 100 mol % of tetrafluoroethylene and 0 to 15 mol % of a monomer represented by the following formula (7):

$$CF_2=CF-Rf$$

(wherein Rf is $Rf^1$ or $-ORf^1$; and $Rf^1$ is a C1-C5 perfluoroalkyl group).

From the viewpoint of the heat resistance of the thermoplastic fluoroelastomer (fluorine-containing multi-segmented polymer) to be obtained, the crystal melting point of the non-elastomeric fluorine-containing polymer chain segment is at least 150° C., preferably 200° C. to 360° C.

That is, what is important is that the fluorine-containing multi-segmented polymer (b-1) is a fluorine-containing multi-segmented polymer in which an elastomeric fluorine-containing polymer chain segment and a non-elastomeric fluorine-containing polymer chain segment are bonded by blocking or grafting in each molecule.

Accordingly, the fluorine-containing multi-segmented polymer (b-1) may be produced by a variety of known processes in which an elastomeric segment and a non-elastomeric segment are connected by blocking or grafting to form a fluorine-containing multi-segmented polymer. Particularly, the process for preparing a block-type fluorine-containing multi-segmented polymer described in JP S58-04728 B and the process for preparing a graft-type fluorine-containing multi-segmented polymer described in JP S62-34324 A are preferably employed.

In order to obtain a homogeneous and regular segmented polymer having a high segmentation percentage (block percentage), particularly preferred is a block-type fluorine-containing multi-segmented polymer synthesized by the iodine transfer polymerization method described in JP S58-04728 B and KOBUNSHI RONBUNSHU Japanese Journal of Polymer Science and Technology (Vol. 49, No. 10, 1992).

A mere mixture of an elastomeric fluorine-containing polymer and a non-elastomeric fluorine-containing polymer may usually have insufficient mechanical properties (particularly at high temperatures) and reduced abrasion resistance, flexibility, and durability, although the effects differ according to the type, mixing properties, and compatibility of each polymer mixed.

On the other hand, a multi-segmented polymer prepared by bonding an elastomeric segment and a non-elastomeric segment by blocking or grafting can have improved heat resistance and mechanical properties (particularly at high temperatures) in comparison to the mere mixture of an elastomeric fluorine-containing polymer and a non-elastomeric fluorine-containing polymer.

The elastomeric segment can be prepared by the iodine transfer polymerization method, which is known as a process for preparing a fluoroelastomer (JP S58-04728 B, JP S62-12734 A). An example is a method of emulsion polymerizing a perhalo olefin and, if necessary, a monomer that gives a crosslinking site using a radical initiator in an aqueous medium with an iodine compound, preferably a diiodine compound, in a substantially oxygen-free atmosphere, while stirring the component under pressure. Typical examples of the diiodine compound used include 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, and 1,2-diiodoethane. These compounds may be used alone or may be used in combination. Preferred among these is 1,4-diiodoperfluorobutane. The amount of the diiodine compound is 0.01 to 1% by mass relative to the total mass of the elastomeric segment.

The elastomeric segment obtained in this way has a perhalo-type terminal and has an iodine atom that is the initiation point of block copolymerization of the non-elastomeric segment.

The radical polymerization initiator used for preparing the elastomeric segment in the invention may be an initiator conventionally used for production of a fluorine elastomer by polymerization. Examples of such an initiator include organic and inorganic peroxides and azo compounds. Examples of typical initiators include persulfates, carbonate peroxides, and ester peroxides, and a preferred initiator is ammonium persulfate (APS). APS may be used alone or may be used in combination with a reducing agent such as a sulfite or a sulfurous acid salt.

The elastomeric segment obtained in this way preferably has a number average molecular weight of 5,000 to 750,000, particularly 20,000 to 400,000, from the viewpoint of imparting flexibility, elasticity, and mechanical properties to the entire fluorine-containing multi-segmented polymer.

Subsequently, block copolymerization of the non-elastomeric segment can be performed subsequent to the emulsion polymerization of the elastomeric segment by changing the monomer into those for the non-elastomeric segment.

The number average molecular weight of the non-elastomeric segment can be adjusted within a wide range of 1,000 to 1,200,000, preferably 3,000 to 600,000.

The fluorine-containing multi-segmented polymer (b-1) obtained in this way is composed mainly of polymer molecules in which non-elastomeric segments are bonded to both sides of the elastomeric segment and polymer molecules in which non-elastomeric segments are bonded to one side of the elastomeric segment. The amount of polymer molecules consisting of elastomeric segments and containing no elastomeric segments bonded thereto is at most 20% by mass, preferably at most 10% by mass, relative to the total amount of the segments and the polymer molecules in the fluorine-containing multi-segmented polymer.

The fluorine-containing multi-segmented polymer (b-2) is described below. The fluorine-containing multi-segmented polymer (b-2) contains an elastomeric fluorine-containing polymer chain segment and a non-elastomeric fluorine-containing polymer chain segment. At least 90 mol % of the structural units of the elastomeric fluorine-containing polymer chain segment are perhalo olefins and the non-elastomeric fluorine-containing polymer chain segment contains less than 90 mol % of perhalo olefins as structural units.

The elastomeric fluorine-containing polymer chain segment thereof is the same as that given for the fluorine-containing multi-segmented polymer (b-1).

The non-elastomeric fluorine-containing polymer chain segment is a polymer chain having a crystal melting point of at least 150° C., preferably 200° C. to 360° C.

Examples of the structural units of the non-elastomeric fluorine-containing polymer chain segment include vinylidene fluoride, vinyl fluoride, trifluoroethylene, a compound represented by the following formula (8):

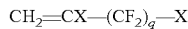

(wherein X is H or F; and q is an integer of 1 to 10), and partially fluorinated olefins such as $CH_2=C(CF_3)_2$.

Also, monomers that are copolymerizable with these monomers, such as ethylene, propylene, vinyl chloride, vinyl ether, vinyl carboxylate, and acrylic acid may be used as copolymerization components.

The fluorine-containing multi-segmented polymer (b-2) can be prepared in the same manner as the fluorine-containing multi-segmented polymer (b-1).

The fluorine-containing multi-segmented polymer (b-3) is described below. The fluorine-containing multi-segmented polymer (b-3) contains an elastomeric fluorine-containing polymer chain segment and a non-elastomeric fluorine-containing polymer chain segment. The elastomeric fluorine-containing polymer chain segment contains less than 90 mol % of perhalo olefins as structural units and at least 90 mol % of the structural units of the non-elastomeric fluorine-containing polymer chain segment are perhalo olefins or the non-elastomeric fluorine-containing polymer chain segment contains less than 90 mol % of perhalo olefins as structural units.

The elastomeric fluorine-containing polymer chain segment of the fluorine-containing multi-segmented polymer (b-3) is a polymer chain having a glass transition point of at most 25° C., preferably at most 0° C.

The elastomeric fluorine-containing polymer chain segment contains less than 90 mol % of perhalo olefins as structural units. Examples of the structural units other than the perhalo olefins are the same as those given for the vinylidene fluoride fluoroelastomer, which is a non-perfluoro fluoroelastomer (a-1).

The non-elastomeric fluorine-containing polymer chain segment of the fluorine-containing multi-segmented polymer (b-3) is the same as the non-elastomeric fluorine-containing polymer chain segment in the fluorine-containing multi-segmented polymer (b-1) or (b-2), preferably the same as the non-elastomeric fluorine-containing polymer chain segment in (b-2).

The fluorine-containing multi-segmented polymer (b-3) contains 40 to 95% by mass of the elastomeric fluorine-containing polymer chain segment and 5 to 60% by mass of the non-elastomeric fluorine-containing polymer chain segment.

The fluorine-containing multi-segmented polymer (b-3) can be prepared in the same manner as the fluorine-containing multi-segmented polymers (b-1) and (b-2).

Specific examples of the fluorine-containing multi-segmented polymer (b-3) include DAI-EL Thermo T-530, T-550, and T-630 available from Daikin Industries, Ltd. and CEFRAL SOFT available from Central Glass Co., Ltd.

In the invention, a composition containing the fluoroelastomer (a) and the thermoplastic fluoroelastomer described above may be used.

A first fluoroelastomer composition containing the non-perfluoro fluoroelastomer (a-1) and the fluorine-containing multi-segmented polymer (b-1) can be obtained by mixing the non-perfluoro fluoroelastomer (a-1) and the fluorine-containing multi-segmented polymer (b-1) at any ratio in the form of dispersion or by dry blending these at any ratio with an open roll.

Also, in order to improve the mold release properties in molding, additives such as an internal mold release agent may be added as appropriate as long as the effects of the invention are not impaired.

A second fluoroelastomer composition containing the non-perfluoro fluoroelastomer (a-1) and the fluorine-containing multi-segmented polymer (b-2) can be obtained in the same manner as the first fluoroelastomer composition.

The above additive may be added as appropriate as long as the effects of the invention are not impaired and a cross-linking agent may be added in accordance with the type of the crosslinking method described below.

A third fluoroelastomer composition containing the perfluoro fluoroelastomer (a-2) and the fluorine-containing multi-segmented polymer (b-3) can be obtained in the same manner as the first fluoroelastomer composition.

The above additive may be added as appropriate as long as the effects of the invention are not impaired and a cross-linking agent may be added in accordance with the type of the crosslinking method described below.

A fourth fluoroelastomer composition containing the perfluoro fluoroelastomer (a-2) and the fluorine-containing multi-segmented polymer (b-1) can be obtained in the same manner as the first fluoroelastomer composition.

Both the perfluoro fluoroelastomer (a-2) and the fluorine-containing multi-segmented polymer (b-1) are poor in crosslinking efficiency by radiation and substantially cannot be crosslinked by radiation. Therefore, a crosslinking site which enables peroxide crosslinking, for example, needs to be introduced into at least one of the rubbers for crosslinking.

A preferred example of the fluoroelastomer with a crosslinking site introduced therein is a fluoroelastomer with iodine or bromine introduced into a polymer terminal. This fluoroelastomer is obtained by introducing a compound represented by the following formula (9):

$$RI_xBr_y$$

(wherein R is a C1-C16 saturated or unsaturated fluorohydrocarbon or chlorofluorohydrocarbon group or a C1-C3 hydrocarbon group; and x and y are each an integer of 0 to 2 and 1≤x+y≤2) in preparation by polymerization. The iodine or bromine that is introduced in this way functions as a crosslinking site.

Examples of the compound represented by the following formula (9):

$$RI_xBr_y$$

(wherein R is a C1-C16 saturated or unsaturated fluorohydrocarbon or chlorofluorohydrocarbon group or a C1-C3 hydrocarbon group; and x and y are each an integer of 0 to 2 and 1≤x+y≤2) include 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluoroebutane, 3-bromo-4-iodoperfluorobutene-1,2-bromo-4-iodoperfluorobutene-1, monoiodomonobromo-substituted benzene, diiodomonobromo-substituted benzene, and (2-iodoethyl)-substituted benzene and (2-bromoethyl)-substituted benzene.

From the viewpoints of properties such as polymerization reactivity, crosslinking reactivity, and easy availability, preferably used among these are 1,4-diiodoperfluorobutane and diiodomethane.

The amount of the compound represented by the following formula (9):

$$RI_xBr_y$$

(wherein R is a C1-C16 saturated or unsaturated fluorohydrocarbon or chlorofluorohydrocarbon group or a C1-C3 hydrocarbon group; and x and y are each an integer of 0 to 2 and 1≤x+y≤2) is 0.0001 to 5% by mass, preferably 0.01 to 1% by mass of the total mass of the fluoroelastomer to be obtained.

Another method for introducing a crosslinking site is a method of copolymerizing a small amount of a monomer that gives a crosslinking site.

Preferred examples of such a monomer include iodine-containing monomers such as perfluoro(6,6-dihydro-6-iodo-3-oxa-1-hexene) and perfluoro(5-iodo-3-oxa-1-pentene) described in JP H05-63482 B and JP H07-316234 A, bromine-containing monomers described in JP H04-505341 A, a monomer containing a nitrile group, a monomer containing a carboxyl group, and a monomer containing an alkoxycarbonyl group described in JP H04-505345 A and JP H05-500070 A.

A fifth fluoroelastomer composition containing the perfluoro fluoroelastomer (a-2) and the fluorine-containing multi-segmented polymer (b-2) can be obtained in the same manner as the first fluoroelastomer composition.

The above additive may be added as appropriate as long as the effects of the invention are not impaired and a cross-linking agent may be added in accordance with the type of the crosslinking method described below.

The monomer mixed gas used in the invention is explosive, as described by G. H. Kalb et al., in Advances in Chemistry Series, 129, 13 (1973), and the polymerization device needs to be designed so that sparks, which become an ignition source, are not generated. In light of this, the polymerization pressure is preferably kept as low as possible.

The polymerization pressure can be changed in a wide range and is usually within the range of 0.5 to 5 MPa. The higher the polymerization pressure is, the higher the polymerization rate is. Thus, in order to improve the productivity, the polymerization pressure is preferably at least 0.8 MPa.

Some of the polymerization products obtained in this way under certain polymerization conditions may contain no free carboxyl groups. Still, the following acid treatment enables conversion into free carboxyl groups.

Examples of the silicone elastomer used in the invention include silicone rubber and fluorosilicone rubber.

Preferred among the crosslinkable elastomers obtained in this way as the fluorine-containing elastomer used in the invention is a copolymer containing tetrafluoroethylene/perfluoro(alkyl vinyl ether)/a monomer having a crosslinkable functional group, from the viewpoints of heat resistance and chemical resistance.

Examples of the perfluoro(alkyl vinyl ether) include perfluoro(methyl vinyl ether) (PMVE), perfluoro(ethyl vinyl ether) (PEVE), and perfluoro(propyl vinyl ether) (PPVE). Preferred among these is PMVE because it has excellent cold resistance.

From the viewpoint of the copolymerization reactivity, the monomer for introducing a crosslinking site is preferably an iodine-containing monomer, a monomer containing a nitrile group, a monomer containing a carboxyl group, or a monomer containing an alkoxycarbonyl group. A monomer containing a nitrile group is more preferred from the viewpoints of the crosslinking reactivity and the heat resistance of the crosslinking structure formed by the crosslinking reaction.

An example of the method for introducing a carboxyl group, an alkoxycarbonyl group, an iodine atom, a bromine atom, or a sulfonic acid group into a polymer terminal group of the crosslinkable elastomer is the acid treatment described below.

The above crosslinkable elastomer can be prepared by polymerization methods such as emulsion polymerization, suspension polymerization, and solution polymerization.

The emulsifier used for emulsion polymerization may be selected from a wide range. In order to inhibit the chain transfer reaction to the emulsifier molecules that occurs during the polymerization, preferred are salts of a carboxylic acid having a fluorocarbon chain or a fluoropolyether chain. The amount of the emulsifier is preferably about 0.05 to 2% by mass, more preferably 0.2 to 1.5% by mass of the amount of water that is added.

The polymerization initiator used for production of the crosslinkable elastomer by polymerization is preferably an initiator capable of introducing a carboxyl group or a group capable of producing a carboxyl group (e.g., acid fluoride, acid chloride, $CF_2OH$, all of which produce a carboxyl group in the presence of water) into an elastomer terminal. Specific examples include ammonium persulfate (APS) and potassium persulfate (KPS).

A chain transfer agent that is usually used to adjust the molecular weight may be used, but is preferably used as little as possible because it reduces the proportion of the group capable of producing a carboxyl or alkoxycarbonyl group that is introduced a terminal. However, this does not apply when the chain transfer agent is capable of introducing the above group into an elastomer terminal. When a chain transfer agent is not used, the molecular weight can be adjusted by performing polymerization under low pressure, for example less than 2 MPa·G, more preferably at most 1 MPa·G. Other polymerization conditions are not limited. However, in order to produce a polymerization product having a carboxyl group in a terminal and/or a branched chain without the acid treatment described below, the pH of the polymerization system is preferably set to at most 3, i.e., a strong acidic value.

With respect to the crosslinkable elastomer used in the invention, groups such as a metallic salt and ammonium salt of a carboxylic acid that are present in the polymerization product are preferably converted into carboxyl groups by acid treatment on the polymerization product. Suitable methods for acid treatment include a method of cleaning with hydrochloric acid, sulfuric acid, or nitric acid and a method of adjusting the pH of the system of a mixture after the polymerization reaction to at most 3 with these acids.

In order to simplify the process, this acid treatment is preferably applied as an agglomeration technique for isolating the polymerization product from the polymerization reaction mixture by agglomeration. Also, the polymerization mixture may be subjected to acid treatment and then the polymer product may be isolated by lyophilization, for example. Furthermore, a method of agglomeration by ultrasonic waves or mechanical power may be employed.

A carboxyl group may be introduced by oxidizing a crosslinkable elastomer containing iodine or bromine with fuming nitric acid.

Examples of the curing agent used in the invention include peroxide crosslinking curing agents, polyol crosslinking curing agents, polyamine crosslinking curing agents, triazine crosslinking curing agents, oxazole crosslinking curing agents, imidazole crosslinking curing agents, thiazole crosslinking curing agents, and radiation crosslinking curing agents.

The curing agent used in peroxide crosslinking is an organic peroxide that can easily produce a peroxy radical in the presence of heat or a redox system. Specific examples thereof include 1,1-bis(t-butylperoxy)-3,5,5-trimethylcyclohexane, 2,5-dimethylhexane-2,5-dihydroperoxide, di-t-butyl peroxide (Perbutyl D), t-butylcumyl peroxide (Perbutyl C), dicumyl peroxide (Percumyl D, Percumyl D-40, Percumyl D-40 MB(T)), α,α-bis(t-butylperoxy)-p-diisopropylbenzene, 2,5-dimethyl-2,5-di(t-butylperoxy)hexane (Perhexa 25B, Perhexa 25B-40), 2,5-dimethyl-2,5-di(t-butylperoxy) hexyne-3 (Perhexyne 25B, Perhexyne 25B-40), benzoyl peroxide, t-butylperoxybenzene, 2,5-dimethyl-2,5-di(benzoylperoxy)hexane (Perhexa 25Z), t-butylperoxy maleate (t-butyl MA), t-butylperoxyisopropyl carbonate (Perbutyl 1-75), methyl ethyl ketone peroxide (Permek D (DR), Permek H (HR, HY), Permek N (NR, NY), Permek S (SR), Permek F (FR), Permek G (GR, GY)), cyclohexanone peroxide (Perhexa H), acetylacetone peroxide (Percure AH, AL), 1,1-di(t-hexylperoxy)-3,3,5-trimethylcyclohexane (Perhexa TMH), 1,1-di(t-hexylperoxy)cyclohexane (Perhexa HC), 1,1-di(t-butylperoxy)-2-methyl cyclohexane (Perhexa MC), 1,1-di(t-butylperoxy)cyclohexane (Perhexa C-80(S), Perhexa C-75(EB), Perhexa C(C), Perhexa C-40, Perhexa C-40 MB(S)), 2,2-di(t-butylperoxy)butane (Perhexa 22), butyl 4,4-di-(t-butylperoxy) pentanoate (Perhexa V, Perhexa V-40(F)), 2,2-di(4,4-di-(t-butylperoxy)cyclohexyl)propane (Pertetra A), p-menthane hydroperoxide (Permentha H), diisopropylbenzene hydroperoxide (Percumyl P), 1,1,3,3-tetramethylbutyl hydroperoxide (Perocta H), cumene hydroperoxide (Percumyl H-80), t-butyl hydroperoxide (Perbutyl H-69), di(2-t-butylperoxyisopropyl)benzene (Perbutyl P, Perbutyl P-40, Peroxymon F-40, Perbutyl P-40 MB(K)), di-t-hexyl peroxide (Perhexyl D), diisobutyryl peroxide (Peroyl IB), di(3,5,5-trimethylhexanoyl) peroxide (Peroyl 355(S)), dilauroyl peroxide (Peroyl L), disuccinic peroxide (Peroyl SA), a mixture of di-(3-methylbenzoyl) peroxide, benzoyl(3-methylbenzoyl) peroxide, and dibenzoyl peroxide (Nyper BMT-K40, Nyper BMT-M), dibenzoyl peroxide (Nyper BW, Nyper BO, Nyper FF, Nyper BS, Nyper E, Nyper NS), di(4-methylbenzoyl) peroxide (Nyper PMB), di-n-propyl peroxydicarbonate (Peroyl NPP-50M), diisopropyl peroxydicarbonate (Peroyl IPP-50, Peroyl IPP-27), di(4-t-butylcyclohexyl) peroxydicarbonate (Peroyl TCP), di(2-ethylhexyl) peroxydicarbonate (Peroyl OPP), di-sec-butylperoxydicarbonate (Peroyl SBP), cumyl peroxyneodecanoate (Percumyl ND, Percumyl ND-50E), 1,1,3,3-tetramethylbutylperoxyneodecanoate (Perocta ND, Perocta ND-50E), t-hexyl peroxyneodecanoate (Perhexyl ND, Perhexyl ND-50E), t-butylperoxyneodecanoate (Perbutyl ND, Perbutyl ND-50E), t-butylperoxy neoheptanoate (Perbutyl NHP), t-hexylperoxy pivalate (Perhexyl PV, Perhexyl PV-50E), t-butylperoxy pivalate (Perbutyl PV, Perbutyl PV-40E), 1,1,3,3-tetramethylbutylperoxy-2-ethyl hexanoate (Perocta 0), 2,5-dimethyl-2,5-di(2-ethylhexanoylperoxy) hexane (Perhexa 250), t-hexyl peroxy-2-ethyl hexanoate (Perhexyl O, Percure HO(N)), t-butylperoxy-2-ethyl hexanoate (Perbutyl O, Percure O), t-hexyl peroxyisopropyl monocarbonate (Perhexyl I), t-butylperoxy-3,5,5-trimethyl hexanoate (Perbutyl 355), t-butylperoxy laurate (Perbutyl L), t-butylperoxy-2-ethylhexyl monocarbonate (Perbutyl E), t-hexyl peroxybenzoate (Perhexyl Z), t-butyl peroxyacetate (Perbutyl A), a mixture of t-butylperoxy-3-methyl benzoate and t-butylperoxy benzoate (Perbutyl ZT), t-butylperoxy benzoate (Perbutyl Z), t-butylperoxyallyl monocarbonate (peromer AC), 3,3',4,4'-tetra(t-butylperoxycarbonyl)benzophenone (BTTB-25), and 2,3-dimethyl-2,3-diphenylbutane (Nofmer BC-90). Preferred among these are dialkyl curing agents, and particularly preferred is 2,5-dimethyl-2,5-di(t-butylperoxy)hexane. Usually, the type and amount of the organic peroxide are selected in consideration of the amount of active —O—O— and the decomposition temperature.

The curing aid to be used in this case is a compound having reactivity with a peroxy radical and a polymer radical. Examples thereof include multifunctional compounds containing a functional group such as $CH_2=CH-$, $CH_2=CHCH_2-$, $CF_2=CF-$, $CF_2=C(CF_3)-$, $CF_2=C(CH_3)-$, $CF(CF_3)=CF-$, $CF(CH_3)=CF-$, $CF_2=C(C_6H_5)-$, $CF(C_6H_5)=CF-$, $CF_2=CH-$, $CHF=CF-$, $CHF=C(CF_3)-$, $CH(CF_3)=CF-$, and $CF(CF_3)=CH-$ ("$C_6H_5$" in each formula represents a phenyl group). Specific examples thereof include triallyl cyanurate, triallyl isocyanurate (TAIC), triacrylformal, triallyl trimellitate, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N- diallyl acrylamide, 1,6-divinyl dodecafluorohexane, and a compound represented by the following formula (I):

[Chem. 1]

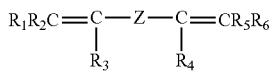

(wherein $R_1$, $R_2$, $R_3$, $R_4$, $R_5$, and $R_6$ are the same as or different from each other and are each H, halogen, or an optionally halogenated group optionally containing one or multiple oxygen groups; and Z is a linear or branched optionally halogenated alkylene group optionally containing a hetero atom, a cycloalkylene group, an arylene group, or a (per) fluoropolyoxyalkylene group).

Examples of the compound represented by the formula (I) include:

a compound represented by the following formula (II):

[Chem. 2]

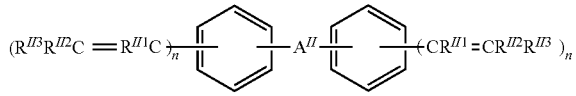

(wherein $A^{II}$ is a single bond, a hetero atom-containing group, a linear or branched alkylene group, a cycloalkylene group, or an arylene group, and each of these groups may be partially or completely fluorinated; $R^{II1}$ is an alkyl group; $R^{II2}$ and $R^{II3}$ are each independently a hydrogen atom, a fluorine atom, an alkyl group, a fluorinated alkyl group, or a substituted or non-substituted aryl group; multiple Rills may be the same as or different from each other; multiple $R^{II2}$s may be the same as or different from each other; multiple $R^{II3}$s may be the same as or different from each other; at least one selected from $R^{II2}$ and $R^{II3}$ is a fluorine atom or a group containing a fluorine atom; ns are each an integer of 1 to 5; and hydrogen atom(s) in each benzene ring may be substituted);

a compound represented by the following formula (III):

[Chem. 3]

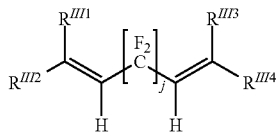

(wherein j is an integer of 2 to 10, preferably 4 to 8; and $R^{III1}$, $R^{III2}$, $R^{III3}$, and $R^{III4}$ are the same as or different from each other and are each H, F, a $C_1$-$C_5$ alkyl group, or a (per)fluoroalkyl group);

a compound represented by the following formula (IV):

[Chem. 4]

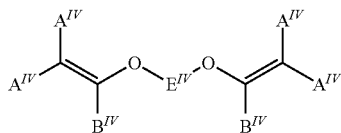

(wherein $A^{IV}$s are the same as or different from each other and at each occurrence and are each independently selected from F, Cl, and H; $B^{IV}$s are the same as or different from each other and at each occurrence and are each independently selected from F, Cl, H, and $OR^{BIV}$ (wherein $R^{BIV}$ is a branched or linear alkyl group that may be partially, substantially, or completely fluorinated or chlorinated); $E^{IV}$ is an optionally fluorinated C2-C10 bivalent group optionally containing an ether bond; $E^{IV}$ is preferably a group represented by —$(CF_2)_m$— wherein m is an integer of 3 to 5; and the compound represented by the formula (IV) is preferably $F_2C=CF-O-(CF_2)_5-O-CF=CF_2$;

a compound by the following formula (V):

[Chem. 5]

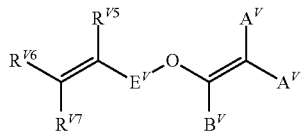

(wherein $E^V$, $A^V$, and $B^V$ are the same as the above defined $E^{IV}$, $A^{IV}$, and $B^{IV}$, respectively; and $R^{V5}$, $R^{V6}$, and $R^{V7}$ are the same as or different from each other and are each H, F, a $C_1$-$C_5$ alkyl group, or a (per)fluoroalkyl group); and a compound containing at least one structure represented by the following formula (VI):

[Chem. 6]

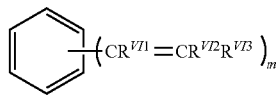

(wherein $R^{VI1}$ to $R^{VI3}$ are each independently a hydrogen atom, a fluorine atom, an alkyl group, a fluorinated alkyl group, or a substituted or non-substituted aryl group, at least one selected from $R^{VI1}$ to $R^{VI3}$ is a fluorine atom or a group containing a fluorine atom; m is an integer of 1 to 5; when m is 2 or greater, the m $R^{VI1}$s to $R^{VI3}$s are the same as or different from each other; and hydrogen atom(s) in the benzene ring may be substituted). When m is 1, the compound preferably contains two or more of the structures. The hetero atom-containing group is a group containing a hetero atom other than a carbon atom. Examples of the hetero atom include an oxygen atom, a nitrogen atom, and a sulfur atom. Examples of the hetero atom-containing group include —O—, —S—, —$SO_2$—, and —CO—.

An example of the compound represented by the formula (VI) is represented by the following formula:

[Chem. 7]

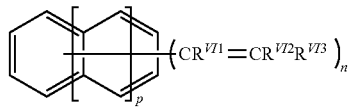

(wherein $R^{VI1}$ to $R^{VI3}$ are as defined above; p is an integer of 0 to 2; and n is an integer of 2 to 6).

Examples of the curing agent used in polyol crosslinking include polyhydric alcohol compounds such as bisphenol A and bisphenol AF.

Examples of the curing agent used in polyamine crosslinking include polyamine compounds such as hexamethylenediamine carbamate, N,N'-dicinnamylidene-1,6-hexanediamine, and 4,4'-bis(aminocyclohexyl)methanecarbamate.

Examples of the curing agent used in triazine crosslinking include organic tin compounds such as tetraphenyl tin and triphenyl tin. In order to cause a cyclotrimerization reaction of cyano groups in the fluorine-containing elastomer and thereby to proceed a triazine crosslinking reaction, a non-oxide filler such as silicon nitride may also be used.

Examples of the curing agent used in oxazole crosslinking, imidazole crosslinking, and thiazole crosslinking include a bisdiaminophenyl curing agent, a bisaminophenol curing agent, and a bisaminothiophenol curing agent, each represented by the following formula (10):

[Chem. 8]

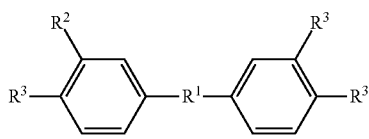

(10)

(wherein $R^1$ is $-SO_2-$, $-O-$, $-CO-$, a C1-C6 alkylene group, a C1-C10 perfluoroalkylene group, or a single bond; and one selected from $R^2$ and $R^3$ is $-NH_2$ and the other is $-NH_2$, $-OH$ or $-SH$, preferably both $R^2$ and $R^3$ are $-NH_2$), a bisamidrazone curing agent represented by the following formula (11):

[Chem. 9]

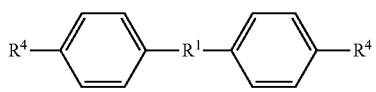

(11)

(wherein R1 is defined as described above, R4 is

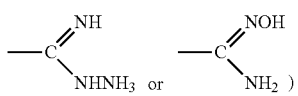

a bisamidoxime curing agent represented by the following formula (12) or (13):

[Chem. 10]

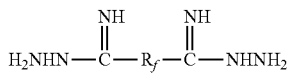

(12)

(wherein Rf is a C1-C10 perfluoroalkylene group),

[Chem. 11]

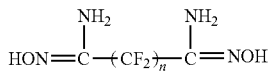

(13)

(wherein n is an integer of 1 to 10), and a compound represented by the following formula (VI):

(wherein $R^{VT1}$ is H; $R^{VT2}$ is selected from the group consisting of H, $NH_2$, and $NR^{VT4}R^{VT5}$; $R^{VT3}$ is selected from the group consisting of Ph, $SO_2H$, $NR^{VT6}R^{VT7}$, 2-pyridine, and $CH_2CONH_2$; $R^{VT4}$ is H; $R^{VT5}$ is selected from the group consisting of Ph, $NH_2$, and CN; $R^{VT6}$ is selected from the group consisting of H, NHPh, $CCONH_2$, a C1-C8 linear alkyl group, and a C1-C8 branched alkyl group; and $R'''^7$ is selected from the group consisting of Ph, $COOC(CH_3)_3$, $NH_2$, $CH_2COOH$, $CSNH_2$, $CNHNH_3^+Cl^-$, p-phenyl CN, COPh, and compounds represented by the following formulas:

[Chem. 12]

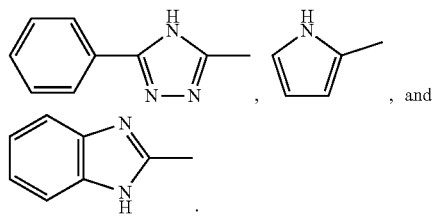

, and

These bisaminophenol curing agent, bisaminothiophenol curing agent, and bisdiaminophenyl curing agent have been conventionally used in a crosslinking system in which the crosslinking site is a nitrile group, and also react with a carboxyl group and an alkoxycarbonyl group and form an oxazole ring, thiazole ring, and an imidazole ring, respectively, to give a crosslinked article.

From the viewpoints of particularly excellent heat resistance, favorable crosslinking reactivity, and relatively easy synthesis, more preferred among these curing agents is a bisdiaminophenyl curing agent having at least two bisamino crosslinkable functional groups represented by the following formula (14):

[Chem. 13]

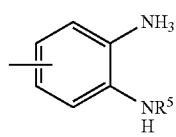

(14)

(wherein $R^5$ is a fluorine atom or a monovalent organic group). Examples of a functional group that can be reacted with the crosslinkable functional groups include a nitrile group, a carboxyl group, and an alkoxycarbonyl group, and an imidazole ring is formed by the reaction.

A still more preferred curing agent is a compound represented by the following formula (15):

[Chem. 14]

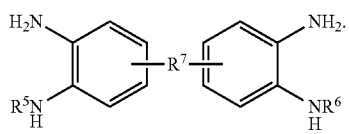

(15)

The substitutent $R^6$ in each crosslinkable reactive group is a monovalent organic group other than hydrogen or a fluorine atom, and a substitutent that forms an N—$R^6$ bond having higher oxidization resistance than an N—H bond is particularly preferred. Herein, "a substitutent that forms an N—$R^6$ bond having higher oxidization resistance than an N—H bond" refers to a substitutent that forms an N—$R^6$ bond that is present in a compound that is less likely to be oxidized than a compound having an N—H bond when an imidazole ring is formed.

Examples of such $R^6$ include, but are not limited to, an aliphatic hydrocarbon group that may be substituted, a phenyl group that may be substituted, or a benzyl group.

Specific examples include compounds wherein at least one $R^6$ is a lower alkyl group having 1 to 10, preferably 1 to 6 carbon atoms, such as —$CH_3$, —$C_2H_5$, and —$C_3H_7$; a fluorine-containing lower alkyl group having 1 to 10, preferably 1 to 6 carbon atoms, such as —$CF_3$, —$C_2F_5$, —$CH_2F$, —$CH_2CF_3$, and —$CH_2C_2F_5$; a phenyl group; a benzyl group; a phenyl group or a benzyl group wherein 1 to 5 hydrogen atoms are each substituted with a fluorine atom, such as —$C_6F_5$ and —$CH_2C_6F_5$; and a phenyl or benzyl group wherein 1 to hydrogen atoms are each substituted with —$CF_3$, such as —$C_6H_5$-n$(CF_3)_n$ and —$CH_2C_6H_5$-n$(CF_3)_n$ (wherein n is an integer of 1 to 5).

Preferred among these are a phenyl group and —$CH_3$ from the viewpoints of particularly excellent heat resistance, favorable crosslinking reactivity, and relatively easy synthesis.

In the compound represented by the formula (15), $R^7$ is —$SO_2$—, —O—, —CO—, an alkylene group that may be substituted,

[Chem. 15]

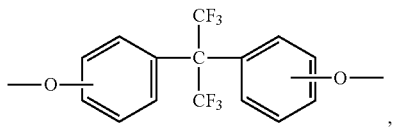

or a single bond.

Preferred specific examples of the alkylene group that may be substituted for $R^7$ include, but are not limited to, a C1-C6 nonsubstituted alkylene group and a C1-C10 perfluoroalkylene group. An example of the perfluoroalkylene group is

[Chem. 16]

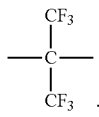

These examples of $R^7$ are known as examples of bisdiaminophenyl compounds from JP H02-59177 B and JP H08-120146 A.

$R^7$ may be bonded to any position of both the right and left benzene rings. From the viewpoint of easy synthesis and easy progress of a crosslinking reaction, either an —$NH_2$ group or an —$NHR^7$ is preferably bonded at the para position.

A particularly preferred example of the curing agent is a compound represented by the following formula (16):

[Chem. 17]

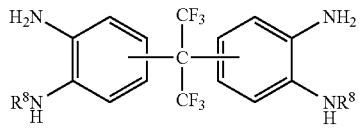

(16)

(wherein $R^8$s are the same or different from each other and are each a C1-C10 alkyl group, a C1-C10 alkyl group containing a fluorine atom, a phenyl group, a benzyl group, or a phenyl or benzyl group wherein 1 to 5 hydrogen atoms are each substituted with a fluorine atom or —$CF_3$).

Examples thereof include, but are not limited to, 2,2-bis-[3-amino-4-(N-methylamino)phenyl]hexafluoropropane, 2,2-bis-[3-amino-4-(N-ethylamino)phenyl]hexafluoropropane, 2,2-bis-[3-amino-4-(N-propylamino)phenyl]hexafluoropropane, 2,2-bis-[3-amino-4-(N-phenylamino)phenyl]hexafluoropropane, 2,2-bis-[3-amino-4-(N-perfluorophenylamino)phenyl]hexafluoropropane, 2,2-bis-[3-amino-4-(N-benzylamino)phenyl]hexafluoropropane, 2,2-bis(3-amino-4-hydroxyphenyl)hexafluoropropane (generic name: bis(aminophenol)AF), 2,2-bis(3-amino-4-mercaptophenyl)hexafluoropropane, tetraminobenzene, bis-3,4-diaminophenylmethane, bis-3,4-diaminophenylether, and 2,2-bis(3,4-diaminophenyl)hexafluoropropane.

The curing agents described above are excellent in mechanical strength, heat resistance, and chemical resistance and give an excellent crosslinked article having good balance in heat resistance and chemical resistance.

The amount of the curing agent for the crosslinkable elastomer is preferably 0.05 to 10 parts by mass, more preferably 1 to 5 parts by mass, relative to 100 parts by mass of the crosslinkable elastomer. Less than 0.05 part by mass of the curing agent tends to cause insufficient crosslinking of the crosslinkable elastomer. More than 10 parts by mass of the curing agent tends to cause poor physical properties of the crosslinked article.

The crosslinkable elastomer composition of the invention may further contain an organic base compound.

Examples of the organic base compound include an octadecylamine represented by $CH_3(CH_2)_{17}$—$NH_2$; an erucamide represented by $H_2N$—C(O)—$(CH_2)_{11}$—CH═CH—$(CH_2)_7CH_3$; an oleamide represented by $H_2N$—C(O)—$(CH_2)_7$—CH═CH—$(CH_2)_7CH_3$; a hexamethylene diamine represented by $H_2N$—$(CH_2)_6$—$NH_2$; and 1,8-diazabicycloundec-7-ene (DBU) represented by

[Chem. 18]

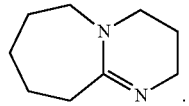

The crosslinkable elastomer composition of the invention and the crosslinkable elastomer preferably contain a material produced under a condition substantially free from metal compounds. The crosslinkable elastomer composition preferably has a metal content of 100 ppm or less, more preferably 50 ppm or less, still more preferably ppm or less. A crosslinkable elastomer composition having a quite small metal content is preferred because such a composition can provide a molded article usable in semiconductor manufacturing processes and pharmaceutical processes where contamination by metal components should be prevented. The metal content can be measured by frame-less atomic adsorption analysis or high frequency inductively coupled plasma atomic emission spectroscopy. The metal content in the invention refers to the total metal content of Fe, Cr, Ni, Cu, Al, Na, Mg, Ca, Zn, Ba, and K. In the crosslinkable elastomer composition, the total of the amount of these metals and the amount of the other metals may fall within the above range.

The crosslinkable elastomer composition of the invention can be prepared by mixing each of the above components using a usual elastomer processing machine such as an open roll, a Banbury mixer, or a kneader. The composition can also be prepared by a method using an internal mixer and a method of co-coagulating the elastomer from an emulsion mixture.

The method for obtaining a pre-molded article from the above composition can be a usual method and can be a known method such as a method of heat-compressing the composition in a mold, a method of injecting the composition into a heated mold, or a method of extruding the composition with an extruder. Since extruded products such as a hose and an electric wire can maintain its shape after extrusion, the pre-molded article extruded without a cross-linking agent can be used as it is. A pre-molded article crosslinked by heating with steam using a cross-linking agent may also be used. Also, in the case of a molded article, such as an O-ring, that has difficulty in maintaining its shape in an uncrosslinked state after released from the mold, use of a pre-molded article that is crosslinked in advance using a cross-linking agent allows the article to maintain the shape.

In the case of peroxide crosslinking, the crosslinking can be performed under usual crosslinking conditions of a crosslinkable elastomer. For example, a crosslinked article can be obtained by press-crosslinking of maintaining the elastomer in a mold under pressure at 120° C. to 200° C. for 1 to 60 minutes and then oven-crosslinking of holding the elastomer in an oven at 120° C. to 250° C. for 0 to 48 hours.

In the case of oxazole crosslinking using a cross-linking agent such as bisaminophenol, the crosslinking can be performed under usual crosslinking conditions of a crosslinkable elastomer. For example, a crosslinked article can be obtained by press-crosslinking of placing the elastomer in a mold under pressure at 120° C. to 250° C. for 1 to 60 minutes and then oven-crosslinking of holding the elastomer in an oven at 120° C. to 320° C. for 0 to 48 hours. Also, a cross-linking agent such as bis(aminophenol)AF may be added to the composition for a known method for crosslinking a crosslinkable elastomer, such as polyamine cross-linking, polyol cross-linking, or peroxide cross-linking, for combined crosslinking.

Imidazole crosslinking in which a carboxyl group is crosslinked with a bisdiaminophenyl cross-linking agent is the most suitable for a carboxyl-containing polymer that has a carboxyl group in an area other than the terminals and gives a crosslinked article having favorable physical properties at a relatively low crosslinking temperature (e.g., 150° C. to 230° C., preferably 170° C. to 200° C.).

The fluoroelastomer molded article of the invention has a weight reduction percentage of 2.5% by mass or less and an amount of particles generated of 0.05% by mass or less after $O_2$ plasma irradiation under the following conditions, a weight reduction percentage of 1.8% by mass or less and an amount of particles generated of 0.05% by mass or less after $NF_3$ plasma irradiation under the following conditions, and a compression set of 50% or less after aging at 300° C. for 70 hours, the conditions being as follows.

Sample: O-ring (AS-568A-214)
Measurement Details:
(1) $O_2$ Plasma
Plasma irradiation device: ICP high-density plasma device (MODEL RIE-101iPH available from Samco Inc.)
Irradiation Conditions
Gas flow rate: 16 SCCM
RF output: 400 Wh
Pressure: 2.66 Pa
Etching time: 30 minutes
Temperature: 100° C.
These conditions allow a perfluoroelastomer (non-filler) to be etched at a rate of 12000 Å/min.
(2) $NF_3$ Plasma
Plasma irradiation device: ICP high-density plasma device (MODEL RIE-101iPH available from Samco Inc.)
Irradiation Conditions
Gas flow rate: 16 SCCM
RF output: 400 Wh
Pressure: 10 Pa
Etching time: 4 hours
Temperature: 200° C.
These conditions allow a thermally oxidized silicon ($SiO_2$) wafer film to be etched at a rate of 90 Å/min.

Such a fluoroelastomer molded article of the invention can be produced from the aforementioned crosslinkable elastomer composition of the invention.

The weight reduction percentage after $O_2$ plasma irradiation is 2.5% by mass or less, preferably 1.5% by mass or less. The weight reduction percentage has no particular lower limit because it is preferably as small as possible. The amount of particles generated after $O_2$ plasma irradiation is 0.05% by mass or less, preferably 0.03% by mass or less. The amount of particles generated has no particular lower limit because it is preferably as small as possible. A weight reduction percentage of 2.5% by mass or less enables production of a seal material with better resistance to $O_2$ plasma, improving the long-term durability. An amount of particles generated of 0.05% by mass or less reduces attachment of particles to a device after $O_2$ plasma irradiation, preventing contamination of the device. Furthermore, such an amount of particles generated reduces attachment of particles to a device, reducing impairment of yield in device production.

The weight reduction percentage after $NF_3$ plasma irradiation is 1.8% by mass or less, preferably 1.5% by mass or less. The weight reduction percentage has no particular lower limit because it is preferably as small as possible. The amount of particles generated after $NF_3$ plasma irradiation is 0.05% by mass or less, preferably 0.03% by mass or less. The amount of particles generated has no particular lower limit because it is preferably as small as possible. A weight reduction percentage of 1.8% by mass or less enables production of a seal material with better resistance to $NF_3$ plasma, improving the long-term durability. A small amount of particles generated reduces attachment of particles to a device after $NF_3$ plasma irradiation, preventing contamination of the device. Furthermore, such an amount of particles generated reduces attachment of particles to a device, reducing impairment of yield in device production.

The compression set after aging at 300° C. for 70 hours is 50% or less, preferably 45% or less, more preferably 40% or less. A small compression set enables production of a seal material with better lifetime, which improves the long-term durability.

The resistance to $O_2$ plasma and the resistance to $NF_3$ plasma can be achieved by using a specific non-oxide ceramic filler. A good compression set at high temperature can be achieved by surface-oxidizing the non-oxide ceramic filler.

Such a molded article can suitably be used as a sealant for semiconductor manufacturing devices requiring particularly high cleanliness, especially semiconductor manufacturing devices involving high density plasma irradiation. Examples of the sealant include O-rings, square rings, gaskets, packings, oil seals, bearing seals, and lip seals. The molded article can also be used for a variety of polymer products used in semiconductor manufacturing devices, such as diaphragms, tubes, hoses, a variety of rubber rolls, and belts, and can also be used for coating materials and lining materials.

The semiconductor manufacturing devices in the invention are not limited to devices for producing semiconductors, but generally widely include producing devices used in the semiconductor field requiring high cleanliness, such as devices for producing liquid crystal panels or plasma panels. Examples thereof include the following.

(1) Etching Systems dry etching systems, plasma etching systems, reactive ion etching systems, reactive ion beam etching systems, sputter etching systems, ion beam etching systems, wet etching systems, ashing systems (2) Cleaning Systems dry etching and cleaning systems, UV/$O_3$ cleaning systems, ion beam cleaning systems, laser beam cleaning systems, plasma cleaning systems, gas etching and cleaning systems, extraction and cleaning systems, soxhlet extraction and cleaning systems, high-temperature and high-pressure extraction and cleaning systems, microwave extraction and cleaning systems, supercritical extraction and cleaning systems (3) Exposure Systems steppers, coaters/developers (4) Polishing Systems CMP systems (5) Film Deposition Systems CVD systems, sputtering systems (6) Diffusion and Ion Implantation Systems oxidation and diffusion systems, ion implantation systems The molded article of the invention exhibits excellent performance as a sealant of a CVD system, a plasma etching system, a reactive ion etching system, an ashing system, or an excimer laser exposure system, for example.

EXAMPLES

The invention is described hereinbelow with reference to, but not limited to, examples.

Production Example 1 (Heat Treatment)

Silicon carbide (NM-SiC available from Nanomakers, average particle size: 30 nm) was subjected to a heat treatment in a muffle furnace at 800° C. for one hour under an atmospheric condition to provide a surface-oxidized silicon carbide.

<Determination of Surface Oxidation State>

The surface oxidation state of the surface-oxidized non-oxide ceramic was determined by ESCA using Mg as an X-ray source at 8 kv-10 mA. In the silicon carbide produced in Production Example 1, 40% of SiC in a 3- to 5-nm surface layer was confirmed to be reduced and converted into $SiO_2$ while 60% of SiC was confirmed to remain as SiC (the ratio between the peak assigned to $SiO_2$ and the peak assigned to SiC was 2:3).

Examples 1 to 5 and Comparative Examples 1 to 10

According to the mixing compositions shown in Table 1, non-oxide ceramic and a cross-linking agent were added to a fluorine-containing elastomer (TFE/PMVE/CNVE ($CF_2$=$CFOCF_2CF(CF_3)OCF_2CF_2CN$)=59.4/40.1/0.5 (mole ratio)), and the components were kneaded with an open roll to prepare a crosslinkable fluoroelastomer composition.

The NphAF used was 2,2-bis[3-amino-4-(N-phenyl amino) phenyl]hexafluoropropane. The heat-treated silicon carbide used was the heat-treated silicon carbide of Production Example 1. The silicon oxide used in Comparative Example 7 was "50" available from Nippon Aerosil Co., Ltd., and the surface-treated silicon oxide used in each of Comparative Examples 8 and 9 was RX50 available from Nippon Aerosil Co., Ltd.

The fluoroelastomer composition obtained in each of Examples 1 and 3 and Comparative Examples 1, 3, 6 to 8, and was pressed at 180° C. for 30 minutes to be crosslinked, and was then subjected to oven crosslinking in an oven at 290° C. for 18 hours to provide a 2-mm-thick crosslinked molded article and an O-ring (size: AS-568A-214) molded article. Similarly, the fluoroelastomer composition obtained in each of Examples 2, 4, and 5 and Comparative Examples 2, 4, 5, and 9 was pressed at 180° C. for 30 minutes to be crosslinked, and was then subjected to oven crosslinking in an oven at 200° C. to 290° C. for 18 hours to provide a 2-mm-thick crosslinked molded article and an 0-ring (size: AS-568A-214) molded article.

The resulting molded articles were measured for the hardness, the compression set, and the weight reduction percentage and amount of particles generated after plasma irradiation by the following methods. Table 1 shows the results.

<Hardness>

The hardness was measured in conformity with JIS K 6301.

<Compression Set>

An O-ring (AS-568A-214) was formed. The compression set of the O-ring was measured after aging at 300° C. for 70 hours and after aging at 300° C. for 168 hours in conformity with JIS K6262.

<Plasma Resistance>

An O-ring (size: P-24) molded article was prepared and subjected to a plasma irradiation treatment under the following conditions and the weight change before and after the irradiation was determined.

(1) $O_2$ Plasma

Plasma irradiation device: ICP high-density plasma device (MODEL RIE-101iPH available from Samco Inc.)

Irradiation Conditions

Gas flow rate: 16 SCCM

RF output: 400 Wh

Pressure: 2.66 Pa

Etching time: 30 minutes

Temperature: 100° C.

These conditions allowing a perfluoroelastomer (non-filler) to be etched at a rate of 12000 Å/min (2) $NF_3$ Plasma Plasma irradiation device: ICP high-density plasma device (MODEL RIE-101iPH available from Samco Inc.)

Irradiation Conditions
 Gas flow rate: 16 SCCM
 RF output: 400 Wh
 Pressure: 10 Pa
 Etching time: 4 hours
 Temperature: 200° C.

These conditions allowing a thermally oxidized silicon (SiO$_2$) wafer film to be etched at a rate of 90 Å/min.

Each sample was weighed to three decimal places with an electronic analytical balance and the obtained value was rounded off to two decimal places. Three samples were used for each kind, and the average weight reduction percentage of each kind was calculated.

A film was pressed on to the O-ring after plasma irradiation, and whether generated particles were transferred to the film was visually observed.

TABLE 1

| | Example 1 | Example 2 | Example 3 | Example 4 | Example 5 | Comparative Example 1 | Comparative Example 2 | Comparative Example 3 |
|---|---|---|---|---|---|---|---|---|
| Crosslinkable elastomer (part by mass) | | | | | | | | |
| TFE/PMVE/CNVE | 100 | 100 | 100 | 100 | 100 | 100 | 100 | 100 |
| Filler (part by mass) (average particle size) | | | | | | | | |
| Oxidized silicon carbide (0.03 um) | 10 | 10 | 15 | 15 | 20 | 10 | 10 | 15 |
| Silicon carbide (0.03 um) | | | | | | | | |
| Silicon carbide (0.13 um) | | | | | | | | |
| Silicon oxide (0.03 um) | | | | | | | | |
| Surface-treated silicon oxide (0.03 um) | | | | | | | | |
| Crosslinking agent (part by mass) | | | | | | | | |
| NphAF | 0.9 | — | 0.9 | — | — | 0.9 | — | 0.9 |
| Silicon nitride (0.03 um) | — | 0.4 | — | 0.4 | 0.4 | — | 0.4 | — |
| Hardness (ShoreA) | 72 | 71 | 75 | 75 | 80 | 72 | 71 | 75 |
| Compression set (70 hr/300° C.) (%) | 33 | 33 | 42 | 36 | 47 | 43 | 59 | 55 |
| Compression set (168 hr/300° C.) (%) | | | 58 | 46 | | | | 75 |
| Plasma resistance | | | | | | | | |
| O$_2$ plasma irradiation | | | | | | | | |
| Weight reduction percentage (%) | 1.90 | 1.89 | 1.42 | 1.40 | 0.98 | 1.92 | 1.93 | 1.51 |
| Surface particle amount (%) | 0.01 | 0.01 | 0.01 | 0.01 | 0.01 | 0.01 | 0.01 | 0.01 |
| Particle transferring | Absent | Absent | Absent | Absent | Absent | Absent | Absent | Absent |
| NF$_3$ plasma irradiation | | | | | | | | |
| Weight reduction percentage (%) | 1.79 | 1.78 | 1.34 | 1.43 | 1.39 | 1.82 | 1.78 | 1.42 |
| Surface particle amount (%) | 0.01 | 0.01 | 0.01 | 0.01 | 0.01 | 0.01 | 0.01 | 0.01 |
| Particle transferring | Absent | Absent | Absent | Absent | Absent | Absent | Absent | Absent |

| | Comparative Example 4 | Comparative Example 5 | Comparative Example 6 | Comparative Example 7 | Comparative Example 8 | Comparative Example 9 | Comparative Example 10 |
|---|---|---|---|---|---|---|---|
| Crosslinkable elastomer (part by mass) | | | | | | | |
| TFE/PMVE/CNVE | 100 | 100 | 100 | 100 | 100 | 100 | 100 |
| Filler (part by mass) (average particle size) | | | | | | | |
| Oxidized silicon carbide (0.03 um) | 15 | 20 | | | | | |
| Silicon carbide (0.03 um) | | | 15 | | | | |
| Silicon carbide (0.13 um) | | | | 15 | | | |
| Silicon oxide (0.03 um) | | | | | 15 | 15 | |
| Surface-treated silicon oxide (0.03 um) | | | | | | | |
| Crosslinking agent (part by mass) | | | | | | | |
| NphAF | — | — | 0.9 | 0.9 | 0.9 | — | 0.9 |
| Silicon nitride (0.03 um) | 0.4 | 0.4 | — | — | — | 0.4 | — |
| Hardness (ShoreA) | 75 | 80 | 74 | 74 | 75 | 75 | 60 |
| Compression set (70 hr/300° C.) (%) | 67 | 84 | 38 | 70 | 37 | 33 | 34 |

TABLE 1-continued

| | | | | | | | |
|---|---|---|---|---|---|---|---|
| Compression set (168 hr/300° C.) (%) | 83 | | | 85 | 54 | 46 | 45 |
| Plasma resistance O₂ plasma irradiation | | | | | | | |
| Weight reduction percentage (%) | 1.54 | 1.15 | 1.71 | — | 1.40 | 1.38 | 3.01 |
| Surface particle amount (%) | 0.02 | 0.01 | 0.07 | — | 0.02 | 0.02 | 0.02 |
| Particle transferring | Absent | Absent | Present | — | Absent | Absent | Absent |
| NF₃ plasma irradiation | | | | | | | |
| Weight reduction percentage (%) | 1.44 | 1.39 | 1.62 | — | 2.10 | 2.17 | 2.73 |
| Surface particle amount (%) | 0.02 | 0.01 | 0.07 | — | 0.01 | 0.01 | 0.02 |
| Particle transferring | Absent | Absent | Present | — | Absent | Absent | Absent |

The invention claimed is:

1. A crosslinkable elastomer composition comprising a crosslinkable elastomer and a surface-oxidized non-oxide ceramic filler,
   wherein a peak assigned to an oxide and a peak assigned to a non-oxide give a ratio (oxide:non-oxide) of 3:7 to 6:4 in ESCA measurement of surface-oxidized non-oxide ceramic filler,
   wherein the non-oxide ceramic filler has an average particle size of 0.1 μm or smaller.

2. The crosslinkable elastomer composition according to claim 1,
   wherein the non-oxide ceramic filler is silicon carbide.

3. The crosslinkable elastomer composition according to claim 1,
   wherein the crosslinkable elastomer is a copolymer of tetrafluoroethylene and perfluoro(alkyl vinyl ether).

4. A fluoroelastomer molded article produced from the crosslinkable elastomer composition according to claim 1, having
   a weight reduction percentage of 2.5% by mass or less and an amount of particles generated of 0.05% by mass or less after 02 plasma irradiation under predetermined conditions,
   a weight reduction percentage of 1.8% by mass or less and an amount of particles generated of 0.05% by mass or less after NF₃ plasma irradiation under the predetermined conditions, and
   a compression set of 50% or less after aging at 300° C. for 70 hours,
   wherein the predetermined conditions are:
   sample: O-ring (AS-568A-214),
measurement details:
(1) O₂ plasma
   plasma irradiation device: ICP high-density plasma device,
   irradiation conditions,
      gas flow rate: 16 SCCM,
      RF output: 400 Wh
      pressure: 2.66 Pa,
      etching time: 30 minutes,
      temperature: 100° C.,
      these conditions allowing a perfluoroelastomer (non-filler) to be etched at a rate of 12000 Å/min,
(2) NF₃ plasma
   plasma irradiation device: ICP high-density plasma device,
   irradiation conditions,
      gas flow rate: 16 SCCM,
      RF output: 400 Wh,
      pressure: 10 Pa,
      etching time: 4 hours,
      temperature: 200° C., and
      these conditions allowing a thermally oxidized silicon (SiO₂) wafer film to be etched at a rate of 90 Å/min.

* * * * *